United States Patent [19]

Boulay et al.

[11] Patent Number: 4,531,691
[45] Date of Patent: Jul. 30, 1985

[54] METHOD AND MEANS FOR PROTECTING AN AIRCRAFT AGAINST DISTURBANCES OF ELECTROSTATIC ORIGIN

[75] Inventors: Jean-Louis Boulay; Serge Larigaldie, both of Chatenay Malabry; Jean-Louis Reibaud, Saint Maur, all of France

[73] Assignees: Office National d'Etudes et de Recherche Aerospatiales (ONERA), Chatillon Sous Bagneux; Avions Marcel Dassault - Breguet Aviation (AMD-BA), Vaucresson, both of France

[21] Appl. No.: 556,074

[22] Filed: Nov. 30, 1983

Related U.S. Application Data

[63] Continuation of Ser. No. 279,718, Jul. 2, 1982, abandoned.

[30] Foreign Application Priority Data

Jul. 3, 1980 [FR] France ................................ 80 14848

[51] Int. Cl.³ ........................ B64D 45/02; H01B 1/00; H05F 3/00
[52] U.S. Cl. .................................... 244/1 A; 361/218; 252/500
[58] Field of Search ............... 244/1 A, 121; 343/872, 343/708; 361/217, 218, 220, 222, 223, 219, 212; 252/511, 500

[56] References Cited

U.S. PATENT DOCUMENTS

| | | | |
|---|---|---|---|
| 2,956,281 | 10/1960 | McMillan et al. | 343/872 R |
| 3,989,984 | 11/1976 | Amason et al. | 361/218 |
| 4,308,568 | 12/1981 | Whewell | 361/216 |
| 4,323,946 | 4/1982 | Truax | 361/218 |
| 4,363,071 | 12/1982 | Rzepecki et al. | 361/220 |
| 4,382,881 | 5/1983 | Levy | 361/218 |

*Primary Examiner*—Galen L. Barefoot
*Attorney, Agent, or Firm*—Staas & Halsey

[57] ABSTRACT

The invention relates to a method and to a structural element for protecting an aircraft against the building-up, when flying, of electrostatic charges on the external metallic surface of the aircraft normally coated with a finishing dielectric paint.

The structural element of the aircraft is subjected to a treatment consisting in applying on the external metallic surface of the aircraft, prior to the depositing of the finishing paint, a resistive electrostatic protection layer having a surface resistivity of between 1 and 100 MΩ per square and being connected to the reference electric potential (i.e., ground or mass) of the frame or body of the aircraft.

The the protective layer is provided, for example, by applying at least a paint layer forming, once dry, a coating exhibiting the required surface resistivity.

17 Claims, 3 Drawing Figures

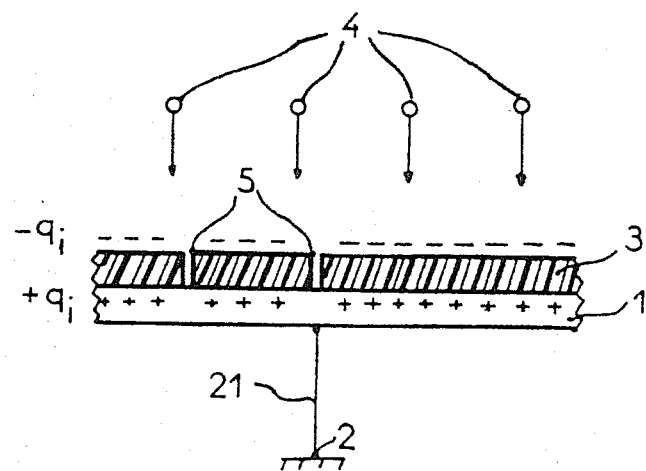
Fig. 1 - PRIOR ART
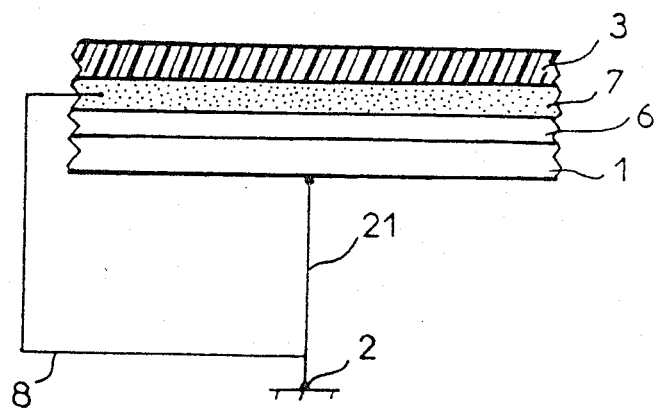
Fig. 2

METHOD AND MEANS FOR PROTECTING AN AIRCRAFT AGAINST DISTURBANCES OF ELECTROSTATIC ORIGIN

This application is a continuation of application Ser. No. 279,718, filed July 2, 1981, now abandoned.

FIELD OF THE INVENTION

This invention relates to the protection against the electrization of flying aircraft with the aim of eliminating the radioelectric disturbances of electrostatic origin. More particularly, the invention relates to means for treating the exterior metallic structures of an aircraft which have to be coated with a finishing paint for reducing build-up of electrostatic charges.

BACKGROUND OF THE INVENTION

The metallic elements used for making aircraft, notably the front structures such as the leading edges of the flying surfaces, the flaps, the frameworks of radomes or canopies, are usually protected by a finishing coating exhibiting the physical properties required for resisting heat, to corrosion and erosion due to the impact of particles at a high speed, such as atmospheric dust particles, ice or snow crystals. Moreover, such a finishing coating meets aesthetics or camouflage requirements according to whether it is applied to commercial aircraft or to military aircraft.

These various requirements lead to the use of paints which form, on the exterior metallic structure of the aircraft, once dry, a film formed of a dielectric material exhibiting the disadvantage of the building-up of electrostatic charges during flight.

The building-up of electrostatic charges on the structure of an aircraft leads to the appearance of electric dicharges which generate, on the one hand, radioelectric interferences detrimental to the good operation of the radio-navigation and radio-communication units on board the aircraft and, on the other hand, disturbances of the electrical circuits of the on-board equipment.

In the present state of the art, the antistatic protection of aircraft consists only in rendering, to some extent, equipotential their external structure by providing, under the layer of finishing paint, the electric continuity of the metallic structures, by treating in a specific manner local dielectric surfaces such as the windshield, the radomes, and the aerial stream-lined shields, and/or by installing high performance static discharges, such as those described in U.S. patent application Ser. No. 986,587 filed Apr. 14, 1978 in the names of Jean-Louis BOULAY and Roland HOARAU, assigned to ONERA.

Such measures, which bring about a great improvement in the operational conditions of the radio equipment on board aircraft, are, however, insufficient for completely suppressing the radioelectric disturbances. Thus, researcher has been carried out, without total success, for solving this problem with new means adapted for being used alone or in combination with known means.

The research carried out by the applicants for overcoming the radioelectric interferences or noise of electrostatic origin have led them to create and develop simulation experiments on the ground of the electrization phenomena appearing in flight of the aircraft. These experiments consist in using an electrostatic charges generator, such as the one described in U.S. Pat. No. 4,228,479 dated Oct. 14, 1980 in the names of Serge LARIGALDIE and Jean CARIOU, assigned to ONERA and by which it is possible to project on the structures to be studied unipolarcharges carried by ice micro-particles. These experiments have demonstrated the existence of surface electric discharges, so-called creeping discharges, which appear locally and surprisingly on the painted metallic structures and which generate spurious electric signals. These spurious signals in the experiment, compared to the spurious or noise signals recorded in flight, confirm the existence, in flight of an aircraft, of creeping discharges.

Such simulation experiments have also demonstrated that the sparking activations, or flash-overs, appear under certain conditions between the external surface of the paint, forming a dielectric coating, and the underlying metallic structure and generate a noise of the impulsional type causing an increase of the general radioelectric noise level. Moreover, such flash-overs are prejudicial to the physical behavior of the finishing layer.

SUMMARY OF THE INVENTION

The principal object of the invention is therefore to provide an electrostatic protection method for the external surfaces of aircraft metallic structures coated with dielectric paint, which significantly suppresses the surface electric discharges and substantially reduces the residual discharges in the dielectric finishing coating.

The method according to the invention for protecting an aircraft against the building-up of electrostatic discharges on the external surface of an aircraft metallic structure coated with a finishing dielectric paint comprises the steps of depositing on the exterior surface of the metallic structure, prior to the application of the finishing dielectric paint, an electrostatic protection having a surface resistivity between 1 and 100 M$\Omega$ per square, electrically connecting the protection layer to the body or frame (electrical mass) or ground of the aircraft, and coating the protection layer with the finishing dielectric paint.

In an embodiment of the method of the invention, there is formed on the exterior surface of the aircraft metallic structure at least a first binding layer, made of a paint, leaving, once dry, a dielectric coating, and then at least a second layer, made of a paint, leaving, once dry, a coating having the required surface resistivity.

As an alternative, there is directly applied on the metallic structure to be treated at least one layer of paint which leaves, once dry, a coating exhibiting the required surface resistivity.

Being easy to practice, the new method does not alter the physical characteristics or the aesthetics of the parts treated and retains to the finishing coating its initial good physical behavior to heat, corrosion and erosion.

The application of the surface treatment method leads to an electrostatic protection layer exhibiting an excellent electric continuity for the flow towards the discharges of the currents generated by the charges accumulated on the finishing coating and which thus provides an efficient protection against disturbances of electrostatic origin.

The invention is also directed to a device made of an electrostatic protection layer provided according to the herein-above method and metallic structure elements of an aircraft having such electrostatic protection layers.

BRIEF DESCRIPTION OF THE DRAWINGS

In the following description, which is given by way of example, reference is made to the accompanying drawings wherein:

FIG. 1 shows schematically a partial cross-section, at large scale, of a portion of a metallic structure according to the prior art which is part of the construction of an aircraft, and which has not been subjected to an antistatic treatment.

FIG. 2 shows schematically a partial cross-sectional view of a portion of a metallic structure which is part of the construction of an aircraft and has been subjected to a protection treatment according to one embodiment of the invention.

DETAILED DESCRIPTION OF THE EMBODIMENTS

Figure 3:
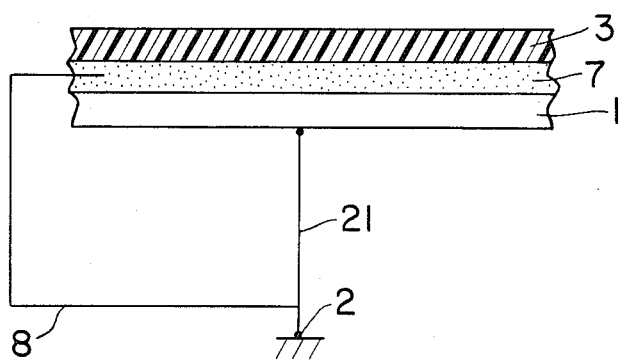
FIG. 3 shows schematically, similar to FIG. 2, a partial cross-sectional view of a portion of a metallic structure which is part of the construction of an aircraft and has been subjected to a protection treatment according to another embodiment of the invention.

According to the prior art, and as shown by FIG. 1, a conductive metallic wall 1 is connected to the frame of the aircraft, (designed by numeral), for providing the references electric potential, for example via a connection 21, and is coated with a finishing dielectric paint coating 3. The paint coating 3 exhibits the required qualities for resistance, erosion to corrosion and heat. It forms, however, a dielectric coating favoring the building-up, in flight and through a triboelectric effect caused by collisions with particles 4, of electric charges generally negative $-q_i$ which displace, due to the proximity of the conductive wall 1 and due to their influence on the latter, positive charges $+q_i$. The building-up of charges, respectively negative and positive, on either side of the insulating coating 3 goes on until the formation of a flash-over inside the dielectric material 3 in the regions where the electric field is the most intense, for example in the regions of the rivets or the wall connections of the aircraft structure. The flash-overs neutralize the charges blocked in the surface of the dielectric element and, due to the local heating produced by the electric arc, (the intensity of which can reach about a hundred amperes), conductive holes or tubular passages 5 of small diameter (e.g., in of the order of 1 $\mu$m,) connecting the metallic wall 1 to the external surface of the dielectric coating 3, are created within the insulating coating 3. Later and as the building-up of electric charges in the finishing coating 3 goes on, discharges of the corona type and new surface discharges are produced simultaneously at the end of the holes 5.

Such corona discharges not only generate an intense radioelectric noise, which is detrimental to the operation of the radio-navigation equipment of the aircraft, but they also degrade the finishing coating. These are significant disadvantages of the prior art.

According to a first embodiment of the invention as shown in FIG. 2, such disadvantages of the prior art are remedied by subjecting the external surface of the metallic wall 1 to a treatment consisting in applying first a dielectric coating 6 for forming a continuous layer of regular thickness; and then a second coating 7 for forming a continuous layer of regular thickness having a superficial (or surface) resistivity, viz. the resistence measured between two opposite sides of a square, of between 1 Megohm per square (1 M$\Omega\square$) and 100 Megohm per square (100 M$\Omega\square$). The coating 6 plays the part of an insulating base for the resistive layer 7. As paint for constituting the primer dielectric coating 6, use is advantageously made of an epoxyde resin binding such as the one commercialized by SOCIETE ASTRAL under the reference P 123, the primer coating layer having a thickness of between 3 and 5 $\mu$m. It possesses adherence qualities on the metallic wall 1 and bonding qualities for the coating 7. Finally, the finishing protection coating 3 is applied and the resistive coating 7 on the one hand, is connected by means of an electrically conductive connection 8 to the metallic stucture 1, and on the other hand, to the electric mass or ground 2 of the aircraft.

According to a second embodiment of the invention as shown in FIG. 3, and under the condition that the coating 7 possesses sufficient adherence qualities on the metallic wall 1, the resistive coating 7 is applied directly on the external surface of the metallic wall 1. Then the finishing coating 3 is applied, and the resistive coating 7 is connected to the electric mass or ground 2 of the aircraft and to the metallic structure 1.

It is possible to check at any moment the efficiency of the antistatic protection layer 7 thus obtained by measuring, through the finishing coating 3, its superficial resistivity and its continuity by means of known surface resistivity-continuity meter apparatus.

For example, for treating a radome metallic framework of an aircraft having an anodic protection with an average thickness of 3 to 5 $\mu$m (e.g., by a thin oxide layer due to anodization of the metallic framework), antistatic paint, such as that developed by AVIONS MARCEL DASSAULT-BREGUET AVIATION, commercially available from Société ASTRAL, 164 rue Ambroise Croizat, 93204 Saint-Denis (France), and having a surface resistivity of less than 100 M$\Omega\square$, are applied to the metallic framework by spraying prior to applying the finishing coating 3 to patent application Ser. No. 79 20695.

After drying of the paint as noted above, a resistive coating 7 is obtained having a thickness between 20 and 50 $\mu$m.

So treated, the part is then metallic coated with a film having a thickness of about 50 $\mu$m of a standard finishing paint. The antistatic protection layer formed by the coating 7 is connected to the electric mass or ground of the radome framework. The connection can be provided either by means of a metallic braid, or directly by contact of the resistive coating 7 with the metallic support of the radome.

In order to render the aircraft structure equipotential, the external portions of each of the front structures are thus separately treated by the method according to the invention. Then, the bodies of the treated structures and the resistive coatings applied are connected to the reference electric mass of the aircraft.

The results obtained on the aircraft structures which have been subjected to the electrostatic protection treatment of this invention are the following:

the creeping discharges are eliminated completely;

the only residual discharges are corona discharges appearing between the finishing layer and the electrostatic protection layer, the intensity of which is limited to a few amperes.

The spectral analysis of such residual discharges shows that they are decorrelated in time so that the radioelectric noise which is generated has a very wide frequency band and is not a source of significant disturbances.

Finally, taking in account the value of the surface resistivity of the electrostatic protection layer applied on the metallic structures, the invention minimizes the hazards of an aircraft being struck by lightning in flight.

We claim:

1. In a means for protecting an aircraft having its external metallic surface coated with a finishing dielectric paint, the improvement comprising: at least one layer of a resistive coating having a surface resistivity between 1 and 100 M $\Omega$, per square and a thickness lower than 50 $\mu$m, said resistive coating being electrically connected to the electrical ground of the aircraft and continuously underlying said finishing dielectric paint, such that the electrostatic protection layer does not emerge through the finishing dielectric paint to the exterior surface thereof, whereby there are only Corona discharges through said finishing dielectric paint, and no longer flashover through said paint nor corresponding electrostatic discharges creeping on said exterior surface of the paint.

2. The means according to claim 1, wherein an underlying dielectric coating is bonded to the said metallic surface and underlies the resistive coating layer.

3. The means according to claim 1, wherein said metallic surface has an outer anodic protection, and the resistive coating layer is directly bonded to said metallic surface with the outer anodic protection.

4. The means according to claim 2, wherein the underlying dielectric coating comprises at least one paint layer.

5. The means according to claim 1, 2, 3 or 4, wherein said resistive coating comprises at least one paint layer continuously underlying said finishing dielectric paint and having said surface resistivity and said thickness.

6. The means according to claim 1, wherein the resistive coating layer underlying the finishing paint is a continuous layer of paint having a thickness of between 20 and 50 $\mu$m.

7. A metallic structural element of an aircraft, particularly in the front structure of the aircraft, comprising:

at least one continuous layer of a resistive coating formed on the structural element, said continuous coating layer having a surface resistivity between 1 and 100 M $\Omega$ per square, and a thickness of less than 50 $\mu$m;

means for electrically connecting the resistive coating with an electric ground of the aircraft; and a finishing dielectric paint over the resistive coating, said dielectric paint being continuous, such that the electrostatic protection layer does not emerge through the finishing dielectric paint to the exterior surface thereof, whereby there are only Corona discharges through said finishing dielectric paint, and no longer flashover through said paint nor corresponding electrostatic discharges creeping on said exterior surface of the paint.

8. A metallic structural element according to claim 7, wherein the resistive coating layer underlying the finishing paint is a continuous layer of paint having a thickness of between 20 and 50 $\mu$m.

9. The metallic structural element according to claim 7, wherein said resistive coating comprises at least one paint layer continuously underlying said dielectric paint and having said surface resistivity and said thickness.

10. A metallic structural element of an aircraft, particularly in the front structure of the aircraft, comprising:

at least a first layer of dielectric coating bonded to the structural element;

at least a second layer of a continuous resistive coating having a surface resistivity between 1 and 100 M $\Omega$ per square and a thickness of less than 50 $\mu$m;

means for connecting the resistive coating with an electric ground of the aircraft; and a finishing dielectric paint over the resistive coating, said dielectric paint being continuous, such that the electrostatic protection layer does not emerge through the finishing dielectric paint to the exterior surface thereof, whereby there are only Corona discharges through said finishing dielectric paint, and no longer flashover through said dielectric paint nor corresponding electrostatic discharges creeping on said exterior surface of the dielectric paint.

11. A metallic structural element according to claim 10, wherein the dielectric coating bonded to the structural element is a paint layer having a thickness of between 3 and 5 $\mu$m.

12. A metallic structural element according to claim 11, wherein the resistive coating layer underlying the finishing paint is a continuous layer of paint having a thickness of between 20 and 50 $\mu$m.

13. The metallic structural element according to claim 10, wherein said resistive coating comprises at least one paint layer continuously underlying said dielectric paint and having said surface resistivity and said thickness.

14. A metallic structural element according to claim 10, wherein the resistive coating layer underlying the finishing paint is a continuous layer of paint having a thickness of between 20 and 50 $\mu$m.

15. A metallic structural element of an aircraft, particularly in the front structure of an aircraft, said structural element comprising:

a metallic surface with an outer anodic protection on said structural element;

a layer of a continuous resistive coating having a surface resistivity between 1 and 100 M $\Omega$ per square, a thickness of less than 50 $\mu$m, and overlying said metallic surface;

means for connecting the resistive coating with an electric ground of the aircraft; and a finishing dielectric paint over said resistive coating, said dielectric paint being continuous, such that the electrostatic protection layer does not emerge through the finishing dielectric paint to the exterior surface thereof, whereby there are only Corona discharges through said finishing dielectric paint, and no longer flashover through said dielectric paint nor corresponding electrostatic discharges creeping on said exterior surface of the dielectric paint.

16. A metallic structural element according to claim 15, wherein the resistive coating layer underlying the finishing paint is a continuous layer of paint having a thickness of between 20 and 50 $\mu$m.

17. The metallic structural element according to claim 15, wherein said resistive coating comprises at least one paint layer continuously underlying said dielectric paint and having said surface resistivity and said thickness.

* * * * *

UNITED STATES PATENT AND TRADEMARK OFFICE
CERTIFICATE OF CORRECTION

PATENT NO. : 4,531,691
DATED : Jul. 30, 1985
INVENTOR(S) : Boulay et al.

It is certified that error appears in the above-identified patent and that said Letters Patent is hereby corrected as shown below:

Front page [73] Assignees, line 2, "Recherche" should be --Recherches--.

Signed and Sealed this

Seventeenth Day of December 1985

[SEAL]

Attest:

DONALD J. QUIGG

Attesting Officer

Commissioner of Patents and Trademarks